US008444407B2

(12) United States Patent
Aengenvoort et al.

(10) Patent No.: US 8,444,407 B2
(45) Date of Patent: May 21, 2013

(54) INSTALLATION FOR APPLYING GLUE TO FIBERS FOR THE PRODUCTION OF FIBERBOARD

(75) Inventors: Dieter Aengenvoort, Weeze (DE); Michael Schöler, Rheurdt (DE); Klaus Schürmann, Jüchen (DE); Lothar Sebastian, Duisburg (DE)

(73) Assignee: Siempelkamp Maschinen-und Anlagenbau GmbH & Co. KG, Krefeld (DE)

( * ) Notice: Subject to any disclaimer, the term of this patent is extended or adjusted under 35 U.S.C. 154(b) by 1012 days.

(21) Appl. No.: 12/447,266

(22) PCT Filed: Oct. 27, 2007

(86) PCT No.: PCT/EP2007/009338
§ 371 (c)(1),
(2), (4) Date: Apr. 27, 2009

(87) PCT Pub. No.: WO2008/071259
PCT Pub. Date: Jun. 19, 2008

(65) Prior Publication Data
US 2012/0138233 A1 Jun. 7, 2012

(30) Foreign Application Priority Data
Dec. 13, 2006 (DE) ........................ 10 2006 058 627

(51) Int. Cl.
*B32B 38/00* (2006.01)
*B27N 1/02* (2006.01)

(52) U.S. Cl.
USPC .......................... 425/83.1; 425/80.1; 425/104

(58) Field of Classification Search
USPC ........................................ 425/80.1, 103, 104
IPC ......................................................... B27N 1/02
See application file for complete search history.

(56) References Cited

U.S. PATENT DOCUMENTS

2003/0066168 A1 4/2003 Schneider ........................... 19/1
2005/0139340 A1 6/2005 Thordahl ...................... 162/199

FOREIGN PATENT DOCUMENTS

WO 2004/035279 * 4/2004
WO WO-2004035278 4/2004
WO WO-2004035279 4/2004
WO WO-2004052603 6/2004
WO WO-2005065905 7/2005

* cited by examiner

*Primary Examiner* — Joseph S Del Sole
*Assistant Examiner* — Kimberly A Stewart
(74) *Attorney, Agent, or Firm* — Andrew Wilford

(57) ABSTRACT

The invention relates to an installation for applying glue to fibers for the production of fiberboard, especially MDF board or similar wood material board. Said installation comprises a fiber feed unit having at least one fiber feed conduit which opens into a fiber exit tube via a fiber deflection element and receives the air that is used to transport the fibers, a chute which is located downstream of the fiber exit tube, a glue application device which has spray nozzles for spraying the fibers that emerge from the fiber exit tube and enter the chute with drops of glue, and a collection device, located downstream of the chute and having an air-permeable transport belt for collecting and optionally carrying off the fibers and a suction device located below the transport belt for suctioning air from the chute through the transport belt, the suction device having one or more suction boxes to which one or more suction pipes are connected. The installation is characterized in that the suction boxes are configured as cleaning boxes having at least one cleaning device for removing fibers that enter the suction boxes through the transport belt.

11 Claims, 5 Drawing Sheets

INSTALLATION FOR APPLYING GLUE TO FIBERS FOR THE PRODUCTION OF FIBERBOARD

CROSS REFERENCE TO RELATED APPLICATIONS

This application is the US national phase of PCT application PCT/EP2007/009338, filed 27 Oct. 2007, published 19 Jun. 2008 as WO2008/071259, and claiming the priority of German patent application 102006058627.1 itself filed 13 Dec. 2006.

FIELD OF THE INVENTION

The invention relates to a system for applying glue to fibers for making fiberboard, especially MDF board or similar wood-containing board, having a fiber supply having at least one fiber feed conduit using air for fiber transport and opening into a fiber-discharge conduit, for example via an arcuate fiber deflection element, having a chute downstream of the fiber-discharge conduit, having a glue applicator having spray nozzles for spraying the fibers that emerge from the fiber-discharge conduit and enter the chute with droplets of glue, between the fiber-discharge conduit and the chute, for example, and having a collection device downstream of the chute with an air-permeable conveyor belt for catching and, if necessary, conveying away the fibers, and a suction device below the conveyor belt for drawing air from the chute through the conveyor belt, the suction device having one or more suction boxes to which one or more suction lines are connected.

BACKGROUND OF THE INVENTION

An MDF board is a medium-density fiberboard. In such a system, the fibers to which glue is to be applied are blown in through a vertical fiber-supply conduit, for example, and a 180° fiber diverter, into a fiber-discharge conduit that is also vertical. Thence the fibers enter into a glue-application zone situated between fiber-discharge conduit and the chute. The glue-coated fibers then drop into the chute, and from there onto the conveyor below the chute. Preferably, an air-jacket supply is furthermore provided, having a line for generating an air jacket that surrounds the fiber stream in the chute, the air jacket and the transport air being drawn off by the suction device, specifically through the foraminous transport belt.

Such a system for applying glue to fibers is known from DE 102 47 412 [WO 2004/035279], DE 102 47 413 [WO 2004/035278], DE 102 47 414 [WO 2004/052603], and DE 10 2004 001 527 [WO 2005/065905]. In the case of the system known from DE 102 47 412, the suction device has a plurality of suction elements, one behind the other in the belt travel direction, i.e. transport direction, in the form of suction registers or suction funnels. The fibers fall through the chute onto the screen belt where they form a fiber mat. Any glue droplets that did not get used also fall through the chute, onto this fiber mat, so that essentially, subsequent glue application occurs. Along the conveyor, a feed mechanism can be provided upstream of the chute that applies fresh fibers to the screen belt, before it passes below the chute. As a result, a preliminary nonwoven fabric essentially forms on the screen belt, so the glue-coated fibers do not land directly on the screen belt, but rather onto the preliminarily formed nonwoven layer. In this manner, contamination of the screen belt with fibers carrying still sticky glue is in theory avoided or reduced. The measures known in this regard have fundamentally proven themselves, but they could be developed further.

OBJECT OF THE INVENTION

The object of the invention is to create a system having the structure described above, with which it is possible to apply glue to fibers for making fiberboard, particularly MDF board, without problems, in an efficient and economical manner. In particular, contamination of the system is to be avoided, or easy and cost-advantageously remedied.

SUMMARY OF THE INVENTION

To accomplish this task, the invention teaches, in the case of a system of the type stated and described initially, that the suction boxes are configured as cleaning boxes having at least one cleaner for removing fibers (to which glue has been applied and/or to which glue has not been applied) that enter the suction boxes through the conveyor belt. Such a cleaner preferably has at least one cleanout port that can be closed by a cover flap or similar closure. According to a preferred further development, the cleaner has a conveyor, for example an auger that can transport fibers away, out of the cleaning box, through the cleanout port.

The invention proceeds from the recognition that, first of all, it is practical to collect the glue-coated fibers in a chute glue applicator in the known manner below the chute on an air-permeable conveyor belt, e.g. a mesh or filter belt, and if suction registers are underneath the conveyor belt to this end. Taking into consideration the power of the suction, i.e. suction volume required in practice, through the conveyor belt, it is impossible to avoid drawing fibers and, in particular, glue-coated fibers, as well as possibly also droplets of glue into the suction boxes through the conveyor belt to a certain degree. The invention has now recognized that perfect and long-lasting operation can be guaranteed if the suction boxes, as cleaning boxes, are provided with a cleaner, for example a transport auger, as well as with a cleanout port. In this way, the cleaning boxes can be cleaned at predetermined intervals, or also continuous or quasi continuously, and consequently be freed of fibers and/or glue-coated fibers, and caked-on residues that are deposited in the cleaning boxes. In this connection, it can be sufficient to work with only two, relatively large suction boxes, and the suction power of these two suction boxes can be different or also the same. Preferably, the cleaning augers work in a direction orthogonal to the transport direction of the conveyor belt, while the suction lines are preferably connected with the suction boxes in a direction that runs parallel to the transport direction of the conveyor belt.

According to a further proposal of the invention, the suction boxes are underneath the chute in only a limited region configured as a suction region, with a suction-free region upstream of this suction region forming a fiber-deposition zone. The lower outlet end of the chute is consequently not fully juxtaposed with suction registers or boxes, but rather, a suction-free region is upstream of the suction region as a fiber-deposition zone. This means that the conveyor belt that enters into the chute region is at first covered with fibers without any suctioning from underneath, before this part of the screen belt then gets into the region of the suction boxes. Surprisingly, the contamination of the suction boxes and also of the belt can be significantly reduced by these measures, even though deposition of the fibers takes place with glue-coated fibers. The length of the suction-free fiber-deposition zone (in the transport direction) amounts to approximately 10 to 70%, preferably 20 to 50% of the length of the suction region (in the transport direction).

Furthermore, the invention proposes that the suction device can be controlled as a function of the contamination of the conveyor belt. Consequently, the suction power can be increased with increasing contamination of the conveyor belt and resulting decreasing air perviousness of the conveyor belt, so that the volume of the air stream suctioned out of the chute can be kept constant by a suitable control, or can be adjusted in desired manner.

The conveyor belt, in known manner, can be guided over deflectors as an endless circulating conveyor belt, with a belt cleaner being provided in the region of the conveyor belt return run. Such a belt cleaner can consist, on the one hand, of a brush, and, on the other hand, of a wet scrubber. In this connection, the invention proposes that this belt cleaner is connected with a controller that controls the cleaning process as a function of the degree of contamination of the screen belt.

According to a further proposal of the invention, which has independent significance, in the case of a system in which the transport air is blown into the chute through the fiber-supply conduit and an air jacket is blown into the chute through an air-jacket line, and both are suctioned out of the chute by the suction device, that an open housing region is provided above the chute, for example in the region of the glue applicator, through which ambient (or room) air is drawn into the chute by the suction device. In this connection, the invention proceeds from the recognition that the flow conditions can be influenced to a positive degree by suctioning in "makeup air" in targeted manner. This is because surprisingly, suctioning in makeup air, i.e. ambient air, leads to support of the fiber stream that exits from the fiber-discharge conduit, so that in total, particularly homogeneous glue application can take place, without any caked-on deposits being observed in the chute near the glue applicator.

To control the air amounts or the volume streams, it is practical to preselect and adjust the volume of the stream of transport air and the volume of the stream of the air jacket in fixed manner, and then to adjust the (variable) volume of the stream of ambient air and consequently makeup air by way of the suction volume of the stream of suction device. In this connection, the invention proposes that the volume of the stream of ambient air forms a ratio to the volume of the stream of transport air of 1:1 to 1:5, preferably 1:2 to 1:3. The volume of the stream of ambient air can form a ratio to the volume of the stream of the air jacket of 1:1 to 1:3, preferably 1:1 to 1:2. Furthermore, it is practical if the volume of the stream of the air jacket to the volume of the stream of transport air forms a ratio of 1:1 to 1:3, preferably 1:1 to 1:2. This results in an advantageous proportion of the volume of the stream of ambient air, as part of the total stream (ambient air+air jacket+transport air), of 10 to 40%, for example 10 to 30%, preferably 15 to 25%.

BRIEF DESCRIPTION OF THE DRAWING

In the following, the invention will be explained in greater detail with reference to a drawing that shows an embodiment merely as an example. In the drawing.

DETAILED DESCRIPTION

Figure 1:
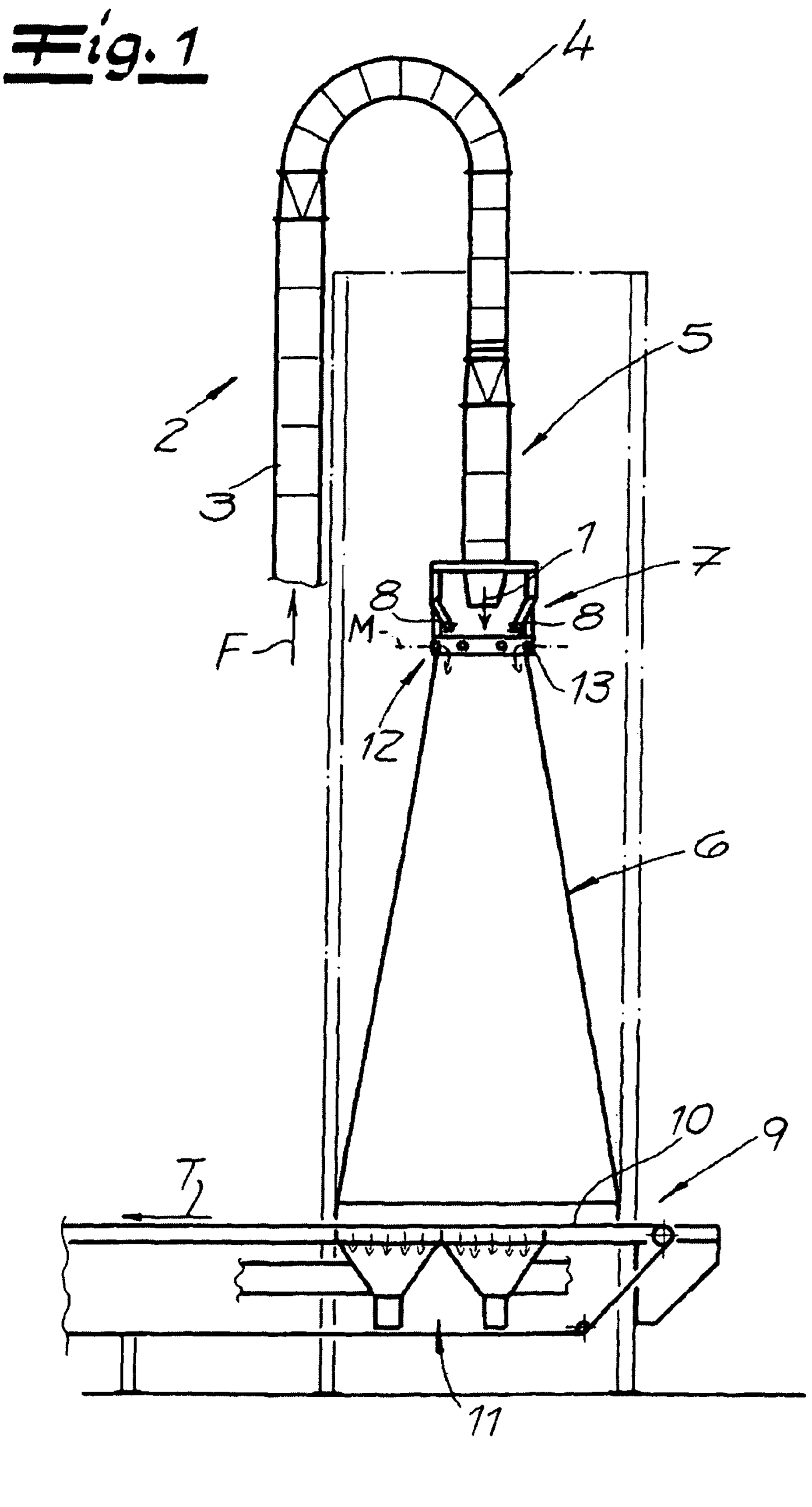
FIG. 1 shows a system according to the invention for applying glue to fibers, in a simplified schematic representation.

The figures show a system for applying glue to fibers 1 for making fiberboard, particularly MDF board. The system is set up for continuous operation and has a fiber supply 2 having at least one fiber-supply conduit 3 to which transport air F is supplied for fiber transport. This vertical fiber-supply conduit 3 connects to a fiber-discharge conduit 5, which is also oriented vertically, through an arcuate 180° fiber-deflection conduit 4. A chute 6 is downstream of this fiber-discharge conduit 5; it is also vertical and has a cross section that flares downward, i.e. in the drop direction. A glue applicator 7 having spray nozzles 8 for spraying glue droplets onto the fibers 1 that exit from the fiber-discharge conduit 5 and enter into the chute 6 is between the fiber-discharge conduit 5 and the chute 6. To this end, an array of for example 10 to 20 spray nozzles on a nozzle ring surrounds the fiber stream that exits from the fiber-discharge conduit 5. An air-jacket supply 12 having one or more air-jacket lines 13 is provided underneath the glue applicator 7 and above the chute 6, to form an air jacket M that surrounds the fiber stream in the chute. The spray nozzles 8 are configured as mixing nozzles, and are connected to at least one glue supply line and one compressed air line. The chute has a collection device 9 having an air-permeable conveyor belt 10 for catching and carrying away the fibers, as well as a suction device 11 for suctioning air out of the chute and through the conveyor belt 10 underneath it. The air-permeable conveyor belt 10 is configured as a mesh or filter belt. The suction device 11 has two suction boxes 14, to each of which a suction line 15 is connected. Furthermore, the collection device 9 has a downstream drying zone 16 through which the fibers that are on the conveyor belt 10 and have had glue applied to them pass. A fiber-discharge device in the form of a fiber-discharge conduit 19 is connected with the collection device 9 via a milling roller 17 and a rotary valve 18.

Figure 3A:
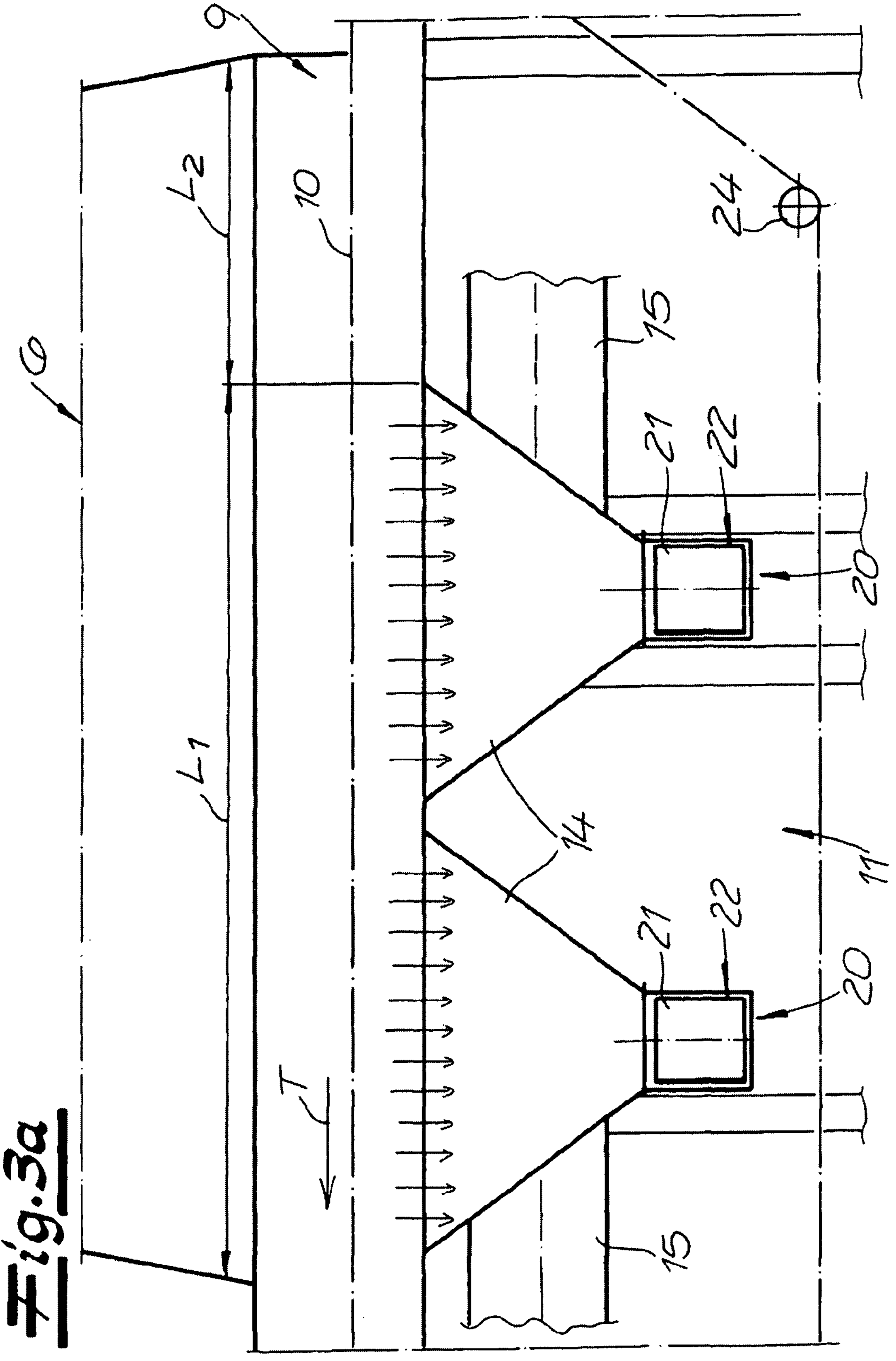
FIG. 3*a* is a detail of the structure of FIG. 2, in a first embodiment.
Figure 3B:
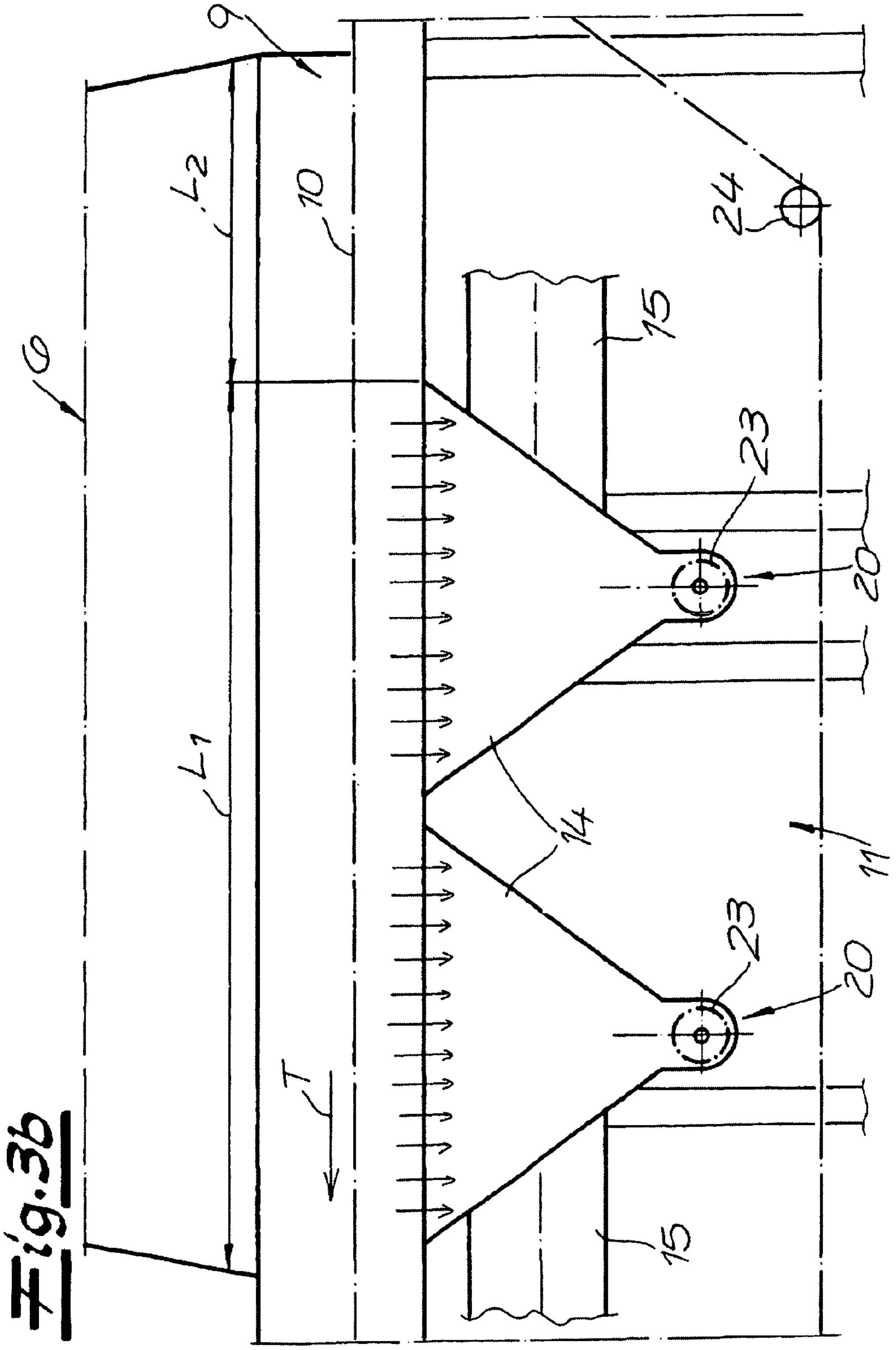
FIG. 3*b* is a detail of the structure of FIG. 2, in a second embodiment.

According to the invention, the suction boxes 14 according to FIGS. 3*a* and 3*b* are configured as cleaning boxes, each having a cleaner 20 for removing fibers that pass through the conveyor belt 20 and enter the suction boxes 14. To this end, the cleaner 20 has a cleanout port 22 that can be closed by a cover flap 21 or similar closure element. FIG. 3*a* shows a first, relatively simple variant, in which the cleaner 20 is configured as a catchment vessel that is rectangular in cross-section, for example, having the face-side cleanout port 22 and cover flap 21 or lid. The material that is drawn through can be removed by hand, for example, after the cover 21, i.e. the lid, is opened or removed. In contrast, FIG. 3*b* shows a second embodiment, in which the cleaner 20 has a conveyor 23 in the suction box 14, which device is configured as a transport auger in the illustrated embodiment, and fibers can be transported away, out of the cleaning box 14, using this transport auger 23, through the cleanout port. In the illustrated embodiment, it can be seen that the two cleaning augers 23 extend in a direction orthogonal to the transport direction T of the conveyor belt 10. The material can be transported away either continuously or periodically. The cleanout port and cover are not shown in FIG. 3*b*. It is also possible to do without a cover.

Figure 2:
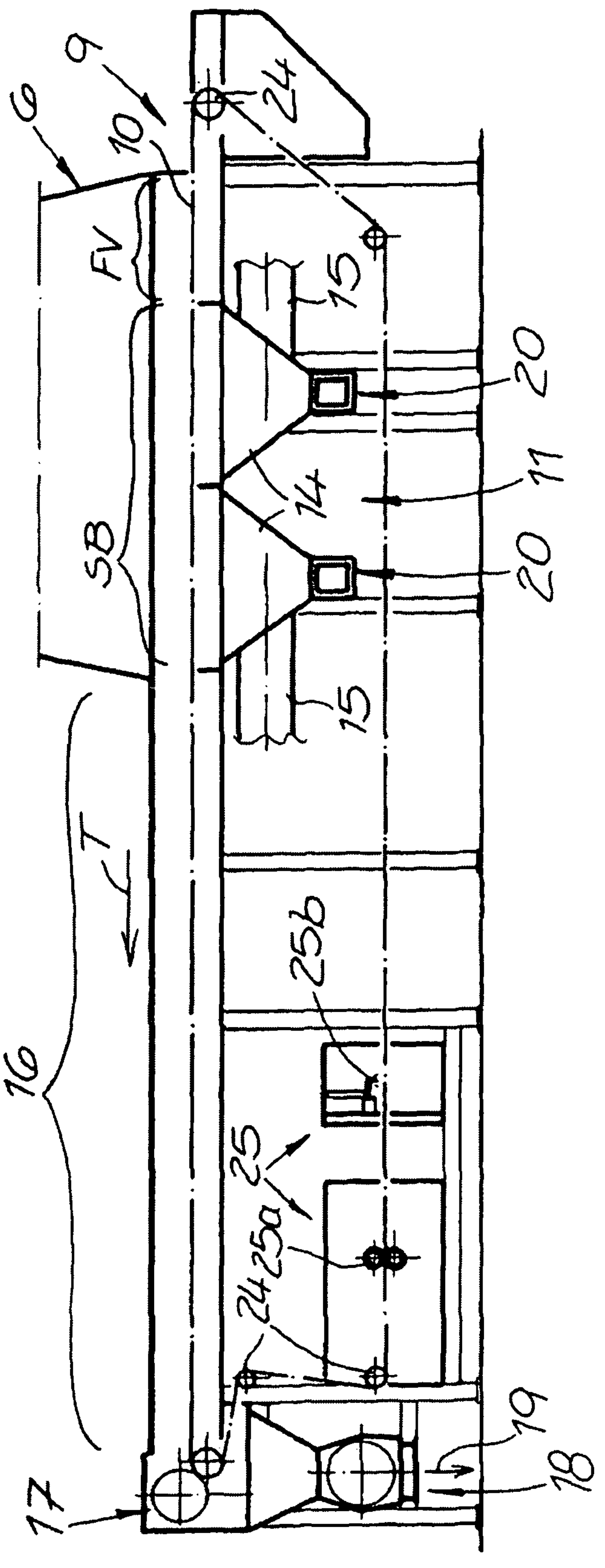
FIG. 2 shows an enlarged detail of the structure of FIG. 1, in the region of the collection device.

Furthermore, it can particularly be seen in FIG. 2 that the two suction boxes 14 are underneath the chute 6 only in a limited region configured as a suction region SB, so that a fiber-deposition zone FV is provided in a suction-free region upstream of the suction boxes 14. This means that no suction box is provided in a limited region of the screen belt 10 directly underneath the chute 6. In this connection, it can be seen in FIG. 3 that this suction-free region FV, which is upstream of the suction region SB, has a length $L_2$ (in the transport direction) that corresponds approximately to 20 to 40%, for example 25 to 35%, of the length $L_1$ of the suction region. Consequently, glue-coated fibers fall onto the screen belt 10 in this fiber-deposition zone FV, without any suctioning from the underside being provided. These fibers form a filter, thereby making it possible to reduce contamination of the subsequent two suction boxes 14.

Furthermore, a controller, not shown, is provided, with which the suction device 11 can be controlled as a function of the contamination of the conveyor belt 10.

The conveyor belt 10 is guided over deflectors 24 as an endlessly revolving conveyor belt, with a belt cleaner 25 in the region of the belt return run. This belt cleaner 25 has a mechanical cleaner, namely a brush 25*a*, on the one hand, and, on the other hand, a wet scrubber 25*b*. These cleaners 25, 25*a*, 25*b* are operated and consequently controlled as a function of the degree of contamination.

Figure 4:
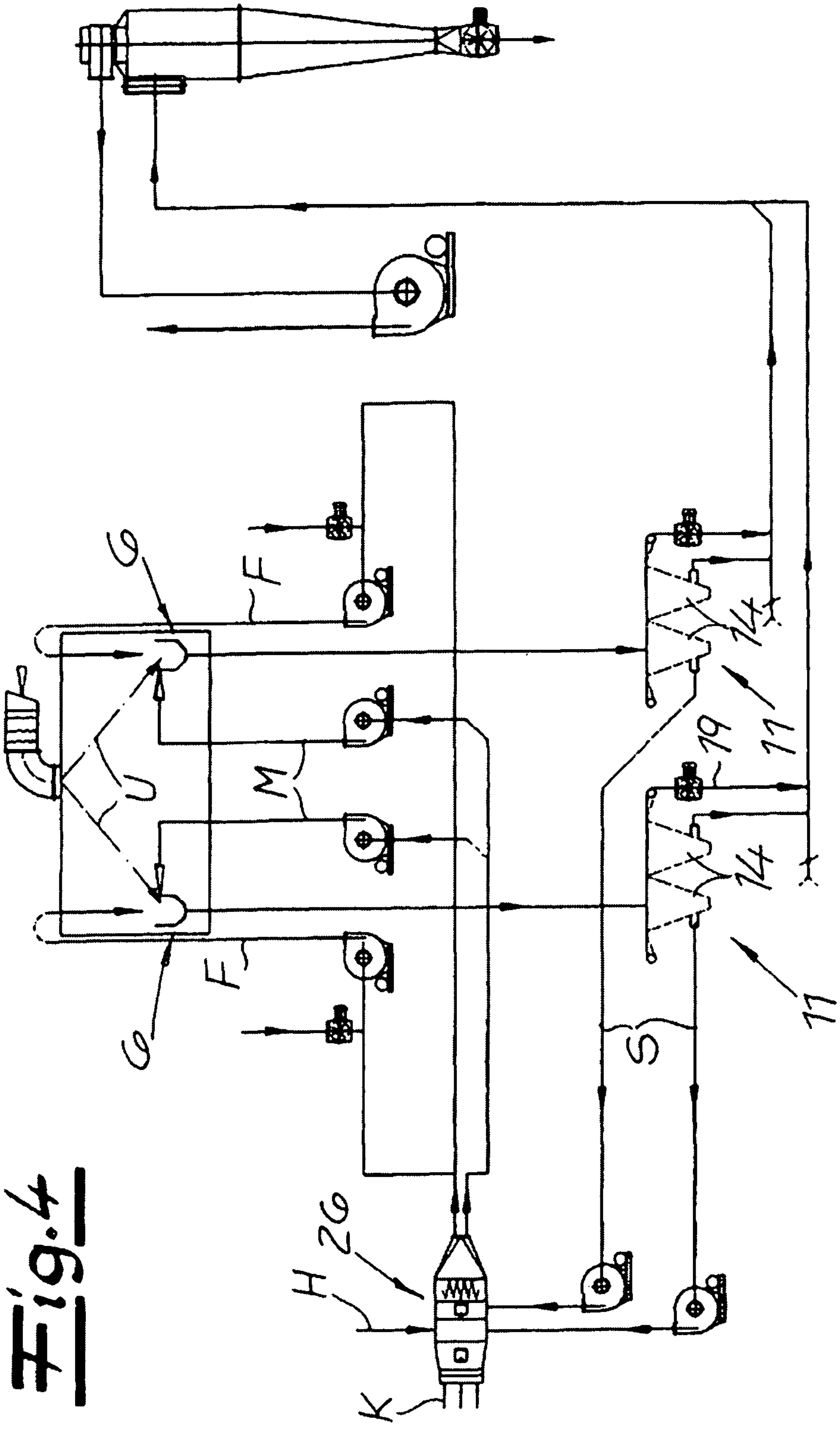
FIG. 4 is a schematic view of the air technology of the system according to the invention.

The air technology of a system according to the invention will be explained using FIG. 4. This shows an embodiment of the invention in which two glue application systems and consequently two chutes 6 are next to one another. These are merely indicated in the sketch. The transport air F and the air jacket M are fed in by a hot gas supply 26, which can use flue gases, for example, that are temperature-regulated by mixing with cool air K. The entering hot gases H can have a temperature of 270° C. From this, the air jacket M and the transport air F at a temperature of 90° C. are created. Furthermore, it is evident that heated room air, i.e. ambient air U at a temperature of 15° C. to 25° C., for example, can be supplied essentially as makeup air. The total air that enters into the chute 6 (transport air F, air jacket M, and room air U) is drawn down through the suction registers 14 and consequently the suction lines 15, with part of the suction air S being fed back to the hot gas feed 26, and another part being made available as fiber transport air, to transport the fibers away. It is consequently of particular importance that the housing have openings above the chute, for example in the region of the glue applicator, through which ambient air U or room air can be drawn into the chute 6 by the suction device 15. In this connection, it is useful if a predetermined volume of the transport air F and a predetermined volume of the air jacket M are preselected, and then the volume of the ambient air U is adjusted with or without feedback from the volume of the suction air S.

The invention claimed is:

1. A system for applying glue to fibers for making fiberboard, the system comprising:

a fiber supply having at least one fiber-supply conduit using air for fiber transport and opening into a fiber-discharge conduit via a fiber-deflection conduit, a chute downstream of the fiber-discharge conduit, a glue applicator having spray nozzles for spraying the fibers that emerge from the fiber-discharge conduit and enter the chute with droplets of glue, a collection device downstream of the chute, having an air-permeable belt for catching and, if necessary, conveying away the fibers, an upwardly open suction box directly underneath the belt for drawing air and fibers from the chute down through the belt and thereby depositing the fibers on the belt, the suction box having a cleanout port closable by a closure element, a suction line connected to the suction box for withdrawing air therefrom and pulling the fibers down onto the belt and drawing some of the fibers through the belt into the box, and a cleaning conveyor separate from and below the suction line and serving for collecting the fibers that enter the suction box through the belt and for removing the fibers from the box through the port.

2. The system according to claim 1 wherein the conveyor is a transport auger that can transport fibers away from the cleaning box through the cleanout port.

3. The system according to claim 1 wherein the suction boxes are underneath the chute in only a limited region configured as a suction region, with the suction-free region upstream of this suction region forming a fiber-deposition zone.

4. The system according to claim 1 wherein the suction lines connected to the suction box can be controlled as a function of contamination of the belt.

5. The system according to claim 1 wherein the belt is endless and guided over deflectors and has an upper run onto which the fibers are deposited and a lower return run, the system further comprising a belt cleaner in the region of the belt return run, the belt cleaner being controlled as a function of contamination of the belt.

6. The system defined in claim 1, further comprising:

means for blowing transport air into the chute through the fiber-supply conduit, the suction line suctioning air out of the chute, an open housing region being provided above the chute through which region ambient air is drawn into the chute by the suction device as an air jacket surrounding the fibers in the chute.

7. The system according to claim 6 wherein at a predetermined volume of the stream of transport air and a predetermined volume of the stream of the air jacket, the volume of the stream of ambient air can be adjusted through the suction volume of the stream of suction air.

8. The system according to claim 6 wherein the volume of the stream of ambient air forms a ratio to the volume of the stream of transport air of 1:1 to 1:5, preferably 1:2 to 1:3.

9. The system according to claim 6 wherein the volume of the stream of ambient air forms a ratio to the volume of the stream of the air jacket of 1:1 to 1:3.

10. The system according to claim 6 wherein the volume of the stream of the air jacket forms a ratio to the volume of the stream of transport air of 1:1 to 1:3.

11. The system according to claim 6 wherein the volume of the stream of ambient air amounts to approximately 10 to 40% of the total volume stream composed of ambient air, transport air, and air jacket.

* * * * *